(12) United States Patent
Zhamu et al.

(10) Patent No.: US 11,791,449 B2
(45) Date of Patent: Oct. 17, 2023

(54) MULTIVALENT METAL ION BATTERY AND MANUFACTURING METHOD

(71) Applicant: Nanotek Instruments, Inc., Dayton, OH (US)

(72) Inventors: Aruna Zhamu, Springboro, OH (US); Bor Z Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 128 days.

(21) Appl. No.: 15/463,543

(22) Filed: Mar. 20, 2017

(65) Prior Publication Data

US 2018/0269478 A1    Sep. 20, 2018

(51) Int. Cl.

| | |
|---|---|
| H01M 4/04 | (2006.01) |
| H01M 4/1393 | (2010.01) |
| H01M 4/134 | (2010.01) |
| H01M 4/133 | (2010.01) |
| H01M 4/587 | (2010.01) |
| H01M 4/40 | (2006.01) |
| H01M 4/1395 | (2010.01) |
| H01M 4/62 | (2006.01) |
| H01M 10/054 | (2010.01) |
| H01M 10/052 | (2010.01) |

(52) U.S. Cl.
CPC ............. *H01M 4/04* (2013.01); *H01M 4/133* (2013.01); *H01M 4/134* (2013.01); *H01M 4/1393* (2013.01); *H01M 4/1395* (2013.01); *H01M 4/40* (2013.01); *H01M 4/587* (2013.01); *H01M 4/62* (2013.01); *H01M 10/052* (2013.01); *H01M 10/054* (2013.01)

(58) Field of Classification Search
CPC ........ H01M 4/04; H01M 4/133; H01M 4/134; H01M 4/1393; H01M 4/1395; H01M 4/40; H01M 4/587; H01M 4/62; H01M 10/052; H01M 10/054
See application file for complete search history.

(56) References Cited

U.S. PATENT DOCUMENTS

| | | | |
|---|---|---|---|
| 2,798,878 A | 7/1957 | Hummers | |
| 4,139,474 A | 2/1979 | Watanabe et al. | |
| 4,939,050 A * | 7/1990 | Toyosawa | ........... H01M 50/147 429/213 |
| 5,283,136 A * | 2/1994 | Peled | .................... H01M 10/05 429/306 |

(Continued)

OTHER PUBLICATIONS

PCT/US18/20430 International Search Report and Written Opinion dated Aug. 2, 2018, 9 pages.

*Primary Examiner* — Helen Oi K Conley

(57) ABSTRACT

Provided is a multivalent metal-ion battery comprising an anode, a cathode, and an electrolyte in ionic contact with the anode and the cathode to support reversible deposition and dissolution of a multivalent metal, selected from Ni, Zn, Be, Mg, Ca, Ba, La, Ti, Ta, Zr, Nb, Mn, V, Co, Fe, Cd, Cr, Ga, In, or a combination thereof, at the anode, wherein the anode contains the multivalent metal or its alloy as an anode active material and the cathode comprises a cathode active layer of a graphite or carbon material having expanded inter-graphene planar spaces with an inter-planar spacing $d_{002}$ from 0.43 nm to 2.0 nm as measured by X-ray diffraction. Such a metal-ion battery delivers a high energy density, high power density, and long cycle life.

25 Claims, 11 Drawing Sheets

(56) References Cited

U.S. PATENT DOCUMENTS

| | | | |
|---|---|---|---|
| 5,344,726 A | 9/1994 | Tanaka et al. | |
| 5,567,539 A * | 10/1996 | Takahashi | H01H 37/323 |
| | | | 429/57 |
| 6,187,475 B1 | 2/2001 | Oh et al. | |
| 8,663,844 B2 | 3/2014 | Kang et al. | |
| 2002/0134964 A1* | 9/2002 | Christian | H01M 4/08 |
| | | | 252/182.1 |
| 2003/0124426 A1* | 7/2003 | Inagaki | H01M 4/525 |
| | | | 429/231.9 |
| 2005/0271574 A1 | 12/2005 | Jang et al. | |
| 2006/0210883 A1* | 9/2006 | Chen | H01M 4/485 |
| | | | 429/326 |
| 2009/0068553 A1* | 3/2009 | Firsich | D21H 13/50 |
| | | | 429/122 |
| 2013/0260246 A1* | 10/2013 | Chen | H01M 4/133 |
| | | | 429/221 |
| 2013/0302697 A1* | 11/2013 | Wang | H01M 4/0445 |
| | | | 429/300 |
| 2015/0255792 A1 | 9/2015 | Xu et al. | |
| 2016/0301096 A1 | 10/2016 | Zhamu et al. | |
| 2016/0372795 A1 | 12/2016 | Xu et al. | |
| 2016/0380268 A1 | 12/2016 | Bucur et al. | |

* cited by examiner

MULTIVALENT METAL ION BATTERY AND MANUFACTURING METHOD

FIELD OF THE INVENTION

The present invention relates generally to the field of rechargeable multivalent metal battery (e.g. zinc-, nickel-, or magnesium-ion battery) and, more particularly, to a high-capacity cathode layer containing a new group of graphite or carbon materials having expanded inter-planar spaces and a method of manufacturing the multivalent metal-ion battery.

BACKGROUND OF THE INVENTION

Historically, today's most favorite rechargeable energy storage devices—lithium-ion batteries—was actually evolved from rechargeable "lithium metal batteries" that use lithium (Li) metal as the anode and a Li intercalation compound (e.g. $MoS_2$) as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns of pure lithium metal, graphite was implemented as an anode active material in place of the lithium metal to produce the current lithium-ion batteries. The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power, and necessity to use pre-lithiated cathodes (e.g. lithium cobalt oxide, as opposed to cobalt oxide), thereby limiting the choice of available cathode materials. Further, these commonly used cathode active materials have a relatively low lithium diffusion coefficient (typically $D \sim 10^{-16}-10^{-11}$ cm$^2$/sec). These factors have contributed to one major shortcoming of today's Li-ion batteries—a moderate energy density (typically 150-220 Wh/kg$_{cell}$) but extremely low power density (typically <0.5 kW/kg).

Supercapacitors are being considered for electric vehicle (EV), renewable energy storage, and modern grid applications. The relatively high volumetric capacitance density of a supercapacitor (10 to 100 times greater than those of electrolytic capacitors) derives from using porous electrodes to create a large surface area conducive to the formation of diffuse double layer charges. This electric double layer capacitance (EDLC) is created naturally at the solid-electrolyte interface when voltage is imposed. This implies that the specific capacitance of a supercapacitor is directly proportional to the specific surface area of the electrode material, e.g. activated carbon. This surface area must be accessible by the electrolyte and the resulting interfacial zones must be sufficiently large to accommodate the EDLC charges.

This EDLC mechanism is based on surface ion adsorption. The required ions are pre-existing in a liquid electrolyte and do not come from the opposite electrode. In other words, the required ions to be deposited on the surface of a negative electrode (anode) active material (e.g., activated carbon particles) do not come from the positive electrode (cathode) side, and the required ions to be deposited on the surface of a cathode active material do not come from the anode side. When a supercapacitor is re-charged, local positive ions are deposited close to a surface of a negative electrode with their matting negative ions staying close side by side (typically via local molecular or ionic polarization of charges). At the other electrode, negative ions are deposited close to a surface of this positive electrode with the matting positive ions staying close side by side. Again, there is no exchange of ions between an anode active material and a cathode active material.

In some supercapacitors, the stored energy is further augmented by pseudo-capacitance effects due to some local electrochemical reactions (e.g., redox). In such a pseudo-capacitor, the ions involved in a redox pair also pre-exist in the same electrode. Again, there is no exchange of ions between the anode and the cathode.

Since the formation of EDLC does not involve a chemical reaction or an exchange of ions between the two opposite electrodes, the charge or discharge process of an EDL supercapacitor can be very fast, typically in seconds, resulting in a very high power density (typically 3-10 kW/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 10-30 Wh/Kg for the lead acid battery and 50-100 Wh/kg for the NiMH battery). Modern lithium-ion batteries possess a much higher energy density, typically in the range of 150-220 Wh/kg, based on the cell weight.

In addition to lithium-ion cells, there are several other different types of batteries that are widely used in society: alkaline $Zn/MnO_2$, nickel metal hydride (Ni-MH), lead-acid (Pb acid), and nickel-admium (Ni—Cd) batteries. Since their invention in 1860, alkaline $Zn/MnO_2$ batteries have become a highly popular primary (non-rechargeable) battery. It is now known that the $Zn/MnO_2$ pair can constitute a rechargeable battery if an acidic salt electrolyte, instead of basic (alkaline) salt electrolyte, is utilized. However, the cycle life of alkaline manganese dioxide rechargeable batteries has been limited to typically 20-30 cycles due to irreversibility associated with $MnO_2$ upon deep discharge and formation of electrochemically inactive phases.

Additionally, formation of a haeterolite ($ZnO:Mn_2O_3$) phase during discharge, when Zn penetrates into the lattice structure of $MnO_2$, has made battery cycling irreversible. The Zn anode also has limitations on cycle life due to the redistribution of Zn active material and formation of dendrites during recharge, causing internal short-circuits. Attempts to solve some of these issues have been made by Oh, et al. [S. M. Oh, and S. H. Kim, "Aqueous Zinc Sulfate (II) Rechargeable Cell Containing Manganese (II) Salt and Carbon Powder," U.S. Pat. No. 6,187,475, Feb. 13, 2001] and by Kang, et al. [F. Kang, et al. "Rechargeable Zinc Ion Battery", U.S. Pat. No. 8,663,844, Mar. 4, 2014]. However, long-term cycling stability and power density issues remain to be resolved. Due to these reasons, the commercialization of this battery has been limited.

Xu, et al. US Pub. No. 2016/0372795 (Dec. 22, 2016) and US Pub. No. 2015/0255792 (Sep. 10, 2015) reported Ni-ion and Zn-ion cells, respectively, which both make use of graphene sheets or carbon nanotubes (CNTs) as the cathode active material. Although these two patent applications claim an abnormally high specific capacity of 789-2500 mAh/g based on the cathode active material weight, there are several serious problems associated with these two cells:

(1) There is no plateau portion in the charge or discharge curves (voltage vs. time or voltage vs. specific capacity), unlike typical lithium-ion batteries. This lack of a voltage curve plateau means the output voltage being non-constant (varying too much) and would require a complicated voltage regulation algorithm to maintain the cell output voltage at a constant level.

(2) Actually, the discharge curve for the Ni-ion cell exhibits an extremely sharp drop in voltage from 1.5 volts to below 0.6 volts as soon as the discharge process begins and, during most of the discharge process, the cell output is below 0.6 volts, which is not very useful. As a point of reference, the alkaline cell (a primary battery) provides an output voltage of 1.5 volts.

(3) The discharge curves are characteristic of surface adsorption or electroplating mechanisms at the cathode, as opposed to ion intercalation. Further, it appears that the main event that occurs at the cathode during the battery discharge is electroplating. The high specific capacity values reported by Xu, et al. are simply a reflection on the high amount of Ni or Zn metal electroplated on the surfaces of graphene or CNTs. Since there is an excess amount of Ni or Zn in the anode, the amount of electroplated metal increases as the discharge time increases. Unfortunately, the electrochemical potential difference between the anode and the cathode continues to decrease since the difference in the metal amount between the anode and the cathode continues to decrease (more Zn or Ni is dissolved from the anode and gets electroplated on cathode surfaces). This is likely why the cell output voltage continues to decrease. The cell voltage output would be essentially zero when the amounts of metal at the two electrodes are substantially equivalent or identical. Another implication of this electroplating mechanism is the notion that the total amount of the metal that can be deposited on the massive surfaces at the cathode is dictated by the amount of the metal implemented at the anode when the cell is made. The high specific capacity (as high as 2,500 mAh/g) of graphene sheets at the cathode simply reflects the excessively high amount of Zn provided in the anode. There is no other reason or mechanism for why graphene or CNTs could "store" so much metal. The abnormally high specific capacity values as reported by Xu, et al. were artificially obtained based on the high amounts of Ni or Zn electroplated on cathode material surfaces, which unfortunately occurred at very low voltage values and are of little utility value.

Clearly, an urgent need exists for new cathode materials that provide proper discharge voltage profiles (having a high average voltage and/or a high plateau voltage during discharge), high specific capacity at both high and low charge/discharge rates (not just at a low rate), and long cycle-life for a multivalent metal secondary battery. Hopefully, the resulting battery can deliver some positive attributes of a supercapacitor (e.g. long cycle life and high power density) and some positive features of a lithium-ion battery (e.g. moderate energy density). These are the main objectives of the instant invention.

SUMMARY OF THE INVENTION

The invention provides a multivalent metal-ion battery comprising an anode, a cathode, and an electrolyte in ionic contact with the anode and the cathode to support reversible deposition and dissolution of a multivalent metal (selected from Ni, Zn, Be, Mg, Ca, Ba, La, Ti, Ta, Zr, Nb, Mn, V, Co, Fe, Cd, Cr, Ga, In, or a combination thereof) at the anode, wherein the anode contains the multivalent metal or its alloy as an anode active material and the cathode comprises a cathode active layer of a graphite or carbon material having expanded inter-graphene planar spaces with an inter-planar spacing $d_{002}$ from 0.43 nm to 2.0 nm as measured by X-ray diffraction. The multivalent metal alloy preferably contains at least 80% by weight of the multivalent element in the alloy (more preferably at least 90% by weight). There is no restriction on the type of alloying elements that can be chosen.

We have observed that a select multivalent metal (e.g. Ni, Zn, Be, Mg, Ca, Ba, La, Ti, Ta, Zr, Nb, Mn, V, Co, Fe, Cd, Ga, In, or Cr), when coupled with a presently invented graphite or carbon material having expanded inter-graphene planar spaces, can exhibit a discharge curve plateau at approximately 1.0 volt or higher (e.g. from 0.85 to 3.7 volts). This plateau regime of a discharge voltage vs. time (or capacity) curve enables the battery cell to provide a useful constant voltage output. A voltage output significantly lower than 1 volt is generally considered undesirable. The specific capacity corresponding to this plateau regime is typically from approximately 100 mAh/g to above 600 mAh/g.

This multivalent metal-ion battery can further comprise an anode current collector supporting the multivalent metal or its alloy or further comprise a cathode current collector supporting the cathode active layer. The current collector can be a mat, paper, fabric, foil, or foam that is composed of conducting nano-filaments, such as graphene sheets, carbon nanotubes, carbon nano-fibers, carbon fibers, graphite nano-fibers, graphite fibers, carbonized polymer fibers, or a combination thereof, which form a 3D network of electron-conducting pathways. The high surface areas of such an anode current collector not only facilitate fast and uniform dissolution and deposition of metal ions, but also act to reduce the exchange current density and, thus, the tendency to form metal dendrites that otherwise could cause internal shorting.

The carbon or graphite material having expanded inter-planar spaces is selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof, wherein the carbon or graphite material has an inter-planar spacing $d_{002}$ from 0.27 nm to 0.42 nm prior to a chemical or physical expansion treatment and the inter-planar spacing $d_{002}$ is increased to from 0.43 nm to 2.0 nm after the expansion treatment.

It may be noted that the above-listed graphite or carbon materials having unexpanded d-spacing (e.g. $d_{002}$ from 0.33 nm to 0.42 nm) can store a small, but non-zero amount of select multivalent metal ions. Thus, the present invention also provides a multivalent metal-ion battery comprising an anode, a cathode, and an electrolyte in ionic contact with the anode and the cathode to support reversible deposition and dissolution of a multivalent metal, selected from Ni, Zn, Be, Mg, Ca, Ba, La, Ti, Ta, Zr, Nb, Mn, V, Co, Fe, Cd, Cr, Ga, In, or a combination thereof, at the anode, wherein the anode contains the multivalent metal or its alloy as an anode active material and the cathode comprises a cathode active layer of a graphite or carbon material having unexpanded inter-graphene planar spaces with an inter-planar spacing $d_{002}$ from 0.33 nm to 0.42 nm as measured by X-ray diffraction and the carbon or graphite material is selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, carbon nano-fibers, carbon fibers, graphite nano-fibers, graphite fibers, carbonized polymer fibers, or a combination thereof. Carbon nanotubes and graphene are not included in this list of carbon or graphite materials.

The expansion treatment includes an expansion treatment includes an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of the graphite or carbon material. The above procedure may be followed by a constrained thermal expansion treatment.

In certain embodiments, the carbon or graphite material having expanded inter-planar spaces is selected from graphite foam or graphene foam having pores and pore walls, wherein the pore walls contain a stack of bonded graphene planes having an expanded inter-planar spacing $d_{002}$ from 0.40 nm to 1.5 nm. Preferably, the stack contains from 2 to 100 graphene planes (hexagonal carbon atom planes).

In certain embodiments, the inter-planar spacing $d_{002}$ of the carbon or graphite material is from 0.5 nm to 1.2 nm. In other embodiments, the inter-planar spacing, $d_{002}$, is from 1.2 nm to 2.0 nm.

Due to the expansion treatments, the carbon or graphite material can contain a non-carbon element selected from oxygen, fluorine, chlorine, bromine, iodine, nitrogen, hydrogen, or boron.

In the invented multivalent metal-ion battery, the electrolyte may contain $NiSO_4$, $ZnSO_4$, $MgSO_4$, $CaSO_4$, $BaSO_4$, $FeSO_4$, $MnSO_4$, $COSO_4$, $VSO_4$, $TaSO_4$, $CrSO_4$, $CdSO_4$, $GaSO_4$, $Zr(SO_4)_2$, $Nb_2(SO_4)_3$, $La_2(SO_4)_3$, $BeCl_2$, $BaCl_2$, $MgCl_2$, $AlCl_3$, $Be(ClO_4)_2$, $Ca(ClO_4)_2$, $Mg(ClO_4)_2$, $Mg(BF_4)_2$, $Ca(BF_4)_2$, $Be(BF_4)_2$, tri(3,5-dimethylphenyl borane, tris(pentafluorophenyl)borane, Alkyl Grignard reagents, magnesium dibutyldiphenyl, Mg(BPh2Bu2)2, magnesium tributylphenyl Mg(BPhBu3)2), or a combination thereof.

In certain embodiments of the present invention, the electrolyte comprises at least a metal ion salt selected from a transition metal sulphate, transition metal phosphate, transition metal nitrate, transition metal acetate, transition metal carboxylate, transition metal chloride, transition metal bromide, transition metal perchlorate, transition metal hexafluorophosphate, transition metal borofluoride, transition metal hexafluoroarsenide, or a combination thereof.

In certain embodiments, the electrolyte comprises at least a metal ion salt selected from a metal sulphate, phosphate, nitrate, acetate, carboxylate, chloride, bromide, or perchlorate of zinc, aluminum, titanium, magnesium, beryllium, calcium, manganese, cobalt, nickel, iron, vanadium, tantalum, gallium, chromium, cadmium, niobium, zirconium, lanthanum, or a combination thereof.

In the multivalent metal-ion battery, the electrolyte comprises an organic solvent selected from ethylene carbonate (EC), dimethyl carbonate (DMC), methylethyl carbonate (MEC), diethyl carbonate (DEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), tetrahydrofuran (THF), toluene, xylene, methyl acetate (MA), or a combination thereof.

In certain embodiments, the layer of carbon or graphite material operates as a cathode current collector to collect electrons during a discharge of the battery and wherein the battery contains no separate or additional cathode current collector.

The cathode active layer of graphite may further comprise an electrically conductive binder material which bonds particles or fibers of the carbon or graphite material together to form a cathode electrode layer. The electrically conductive binder material may be selected from coal tar pitch, petroleum pitch, meso-phase pitch, a conducting polymer, a polymeric carbon, or a derivative thereof.

Typically, the invented secondary battery has an average discharge voltage no less than 1 volt (typically and preferably >1.5 volts) and a cathode specific capacity greater than 200 mAh/g (preferably and more typically >300 mAh/g, more preferably >400 mAh/g, and most preferably >500 mAh/g) based on a total cathode active layer weight. Some cells deliver a specific capacity>600 mAh/g.

Preferably, the secondary battery has an average discharge voltage no less than 2.0 volts (preferably >2.5 volts and more preferably >3.0 volts) and a cathode specific capacity greater than 100 mAh/g based on a total cathode active layer weight (preferably and more typically >300 mAh/g, more preferably >400 mAh/g, and most preferably >500 mAh/g).

The present invention also provides a cathode active layer for a multivalent metal-ion battery. The cathode active layer comprises a graphite or carbon material having expanded inter-graphene planar spaces with an inter-planar spacing $d_{002}$ from 0.43 nm to 2.0 nm as measured by X-ray diffraction. Preferably, the carbon or graphite material is selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof, wherein the carbon or graphite material has an inter-planar spacing $d_{002}$ from 0.27 nm to 0.42 nm prior to a chemical or physical expansion treatment and the inter-planar spacing $d_{002}$ is increased to from 0.43 nm to 2.0 nm after the expansion treatment.

In certain preferred embodiments, the carbon or graphite material is selected from graphite foam or graphene foam having pores and pore walls, wherein the pore walls contain a stack of bonded graphene planes having an expanded inter-planar spacing $d_{002}$ from 0.45 nm to 1.5 nm. Preferably, the stack contains from 2 to 100 graphene planes (more preferably from 2 to 20 graphene planes).

The present invention also provides a method of manufacturing a multivalent metal-ion battery. The method comprises: (a) providing an anode containing a multivalent metal (selected from Ni, Zn, Mg, Ca, Ba, La, Ti, Ta, Zr, Nb, Mn, V, Co, Fe, Cd, Cr, Ga, In, or a combination thereof) or its alloy; (b) providing a cathode containing a carbon or graphite material having expanded inter-planar spaces, $d_{002}$ from 0.43 nm to 2.0 nm; and (c) providing an electrolyte capable of supporting reversible deposition and dissolution of the multivalent metal at the anode and reversible adsorption/desorption and/or intercalation/de-intercalation of ions at the cathode. Preferably, the electrolyte contains an aqueous electrolyte, an organic electrolyte, a molten salt electrolyte, or an ionic liquid The method can further include providing a porous network of electrically conductive nano-filaments to support the multivalent metal or its alloy.

In some preferred embodiments, the carbon or graphite material contains a graphite foam or graphene foam having pore walls composed of multiple graphene planes having inter-planar spacing from 0.40 nm to 2.0 nm.

The step of providing a cathode preferably contains subjecting a carbon or graphite material to an expansion treatment selected from oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation.

DESCRIPTION OF THE PREFERRED EMBODIMENTS

Figure 1A:
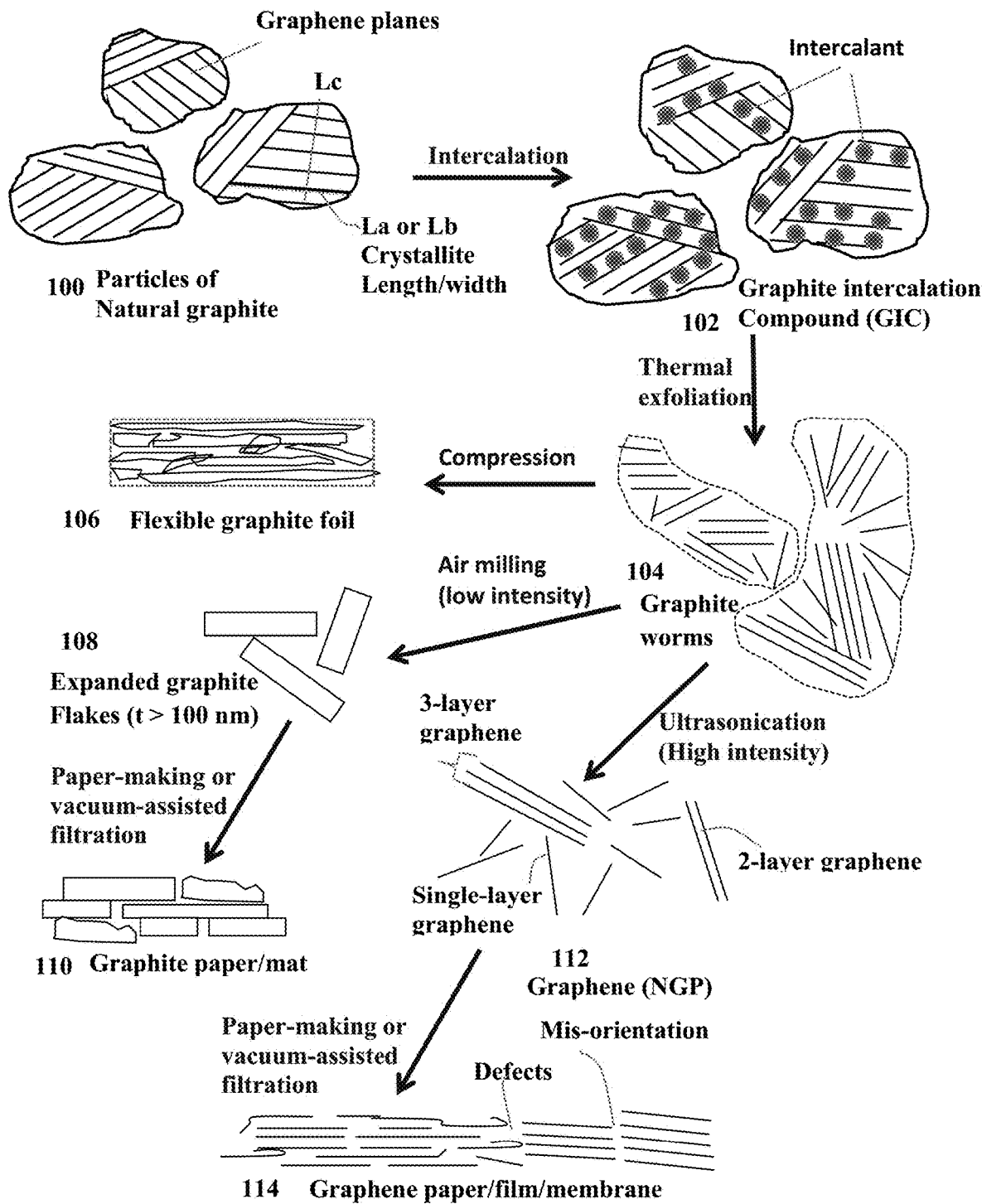
FIG. 1(A) Schematic drawing illustrating the processes for producing intercalated and/or oxidized graphite, subsequently exfoliated graphite worms, and conventional paper, mat, film, and membrane of simply aggregated graphite or graphene flakes/platelets.

As schematically illustrated in the upper portion of FIG. 1(A), bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane or hexagonal carbon atom plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm.

Artificial graphite materials also contain constituent graphene planes, but they have an inter-graphene planar spacing, $d_{002}$, typically from 0.32 nm to 0.36 nm (more typically from 0.3339 to 0.3465 nm), as measured by X-ray diffraction. Many carbon or quasi-graphite materials also contain graphite crystals (also referred to as graphite crystallites, domains, or crystal grains) that are each composed of stacked graphene planes. These include meso-carbon mocro-beads (MCMBs), meso-phase carbon, soft carbon, hard carbon, coke (e.g. needle coke), carbon or graphite fibers (including vapor-grown carbon nano-fibers or graphite nano-fibers), and multi-walled carbon nanotubes (MW-CNT). The spacing between two graphene rings or walls in a MW-CNT is reported to be approximately 0.27 to 0.42 nm. However, the most common spacing values in MW-CNTs are in the range of 0.32-0.35 nm.

It may be noted that the "soft carbon" refers to a carbon material containing graphite domains wherein the orientation of the hexagonal carbon planes (or graphene planes) in one domain and the orientation in neighboring graphite domains are not too different or mis-matched from each other so that these domains can be readily merged together when heated to a temperature above 2,000° C. (more typically above 2,500° C.). Such a heat treatment is commonly referred to as graphitization. Thus, the soft carbon can be defined as a carbonaceous material that can be graphitized. In contrast, a "hard carbon" can be defined as a carbonaceous material that contain highly mis-oriented graphite domains that cannot be thermally merged together to obtain larger domains; i.e. the hard carbon cannot be graphitized.

The spacing between constituent graphene planes of a graphite crystallite in a natural graphite, artificial graphite, and other graphitic carbon materials in the above list can be expanded (i.e. the $d_{002}$ spacing being increased from the original range of 0.27-0.42 nm to the range of 0.43-2.0 nm)

using several expansion treatment approaches, including oxidation, fluorination, chlorination, bromination, iodization, nitrogenation, intercalation, combined oxidation-intercalation, combined fluorination-intercalation, combined chlorination-intercalation, combined bromination-intercalation, combined iodization-intercalation, or combined nitrogenation-intercalation of the graphite or carbon material.

More specifically, due to the van der Waals forces holding the parallel graphene planes together being relatively weak, natural graphite can be treated so that the spacing between the graphene planes can be increased to provide a marked expansion in the c-axis direction. This results in a graphite material having an expanded spacing, but the laminar character of the hexagonal carbon layers is substantially retained. The inter-planar spacing (also referred to as inter-graphene spacing) of graphite crystallites can be increased (expanded) via several approaches, including oxidation, fluorination, and/or intercalation of graphite. This is schematically illustrated in FIG. 1(D). The presence of an intercalant, oxygen-containing group, or fluorine-containing group serves to increase the spacing between two graphene planes in a graphite crystallite. This inter-planar spacing may be further increased to become 1.2 nm-2.0 nm if the intercalated, oxidized, or fluorinated graphite is exposed to a moderate temperature (150-800° C.) under a constant-volume condition. This is herein referred to as a constrained expansion treatment.

In one process, graphite materials having an expanded inter-planar spacing are obtained by intercalating natural graphite particles with a strong acid and/or an oxidizing agent to obtain a graphite intercalation compound (GIC) or graphite oxide (GO), as illustrated in FIG. 1(A). The presence of chemical species or functional groups in the interstitial spaces between graphene planes serves to increase the inter-graphene spacing, $d_{002}$, as determined by X-ray diffraction, thereby significantly reducing the van der Waals forces that otherwise hold graphene planes together along the c-axis direction. The GIC or GO is most often produced by immersing natural graphite powder (100 in FIG. 1(A)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water.

Water may be removed from the suspension to obtain "expandable graphite," which is essentially a mass of dried GIC or dried graphite oxide particles. The inter-graphene spacing, $d_{002}$, in the dried GIC or graphite oxide particles is typically in the range of 0.43-2.0 nm, more typically in the range of 0.5-1.2 nm. This expandable graphite is one kind of the graphite that has expanded inter-graphene spacing (from 0.43 nm to 2.0 nm). It may be noted than the "expandable graphite" is not "expanded graphite" (to be further explained later).

Figure 1B:
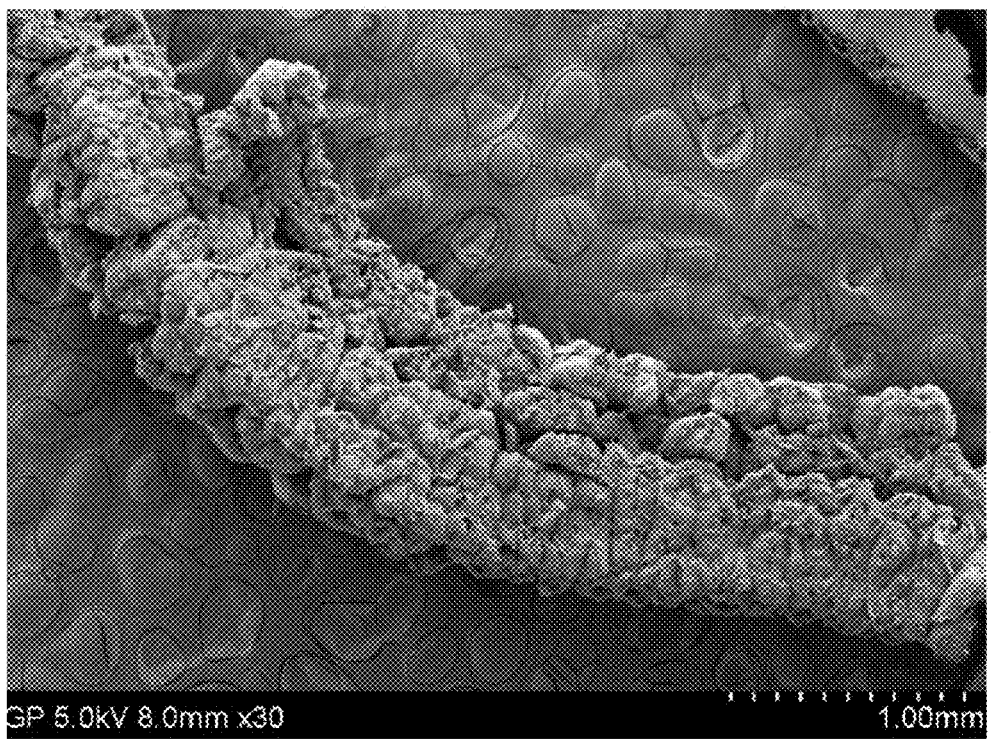
FIG. 1(B) An SEM image of graphite worms.
Figure 1C:
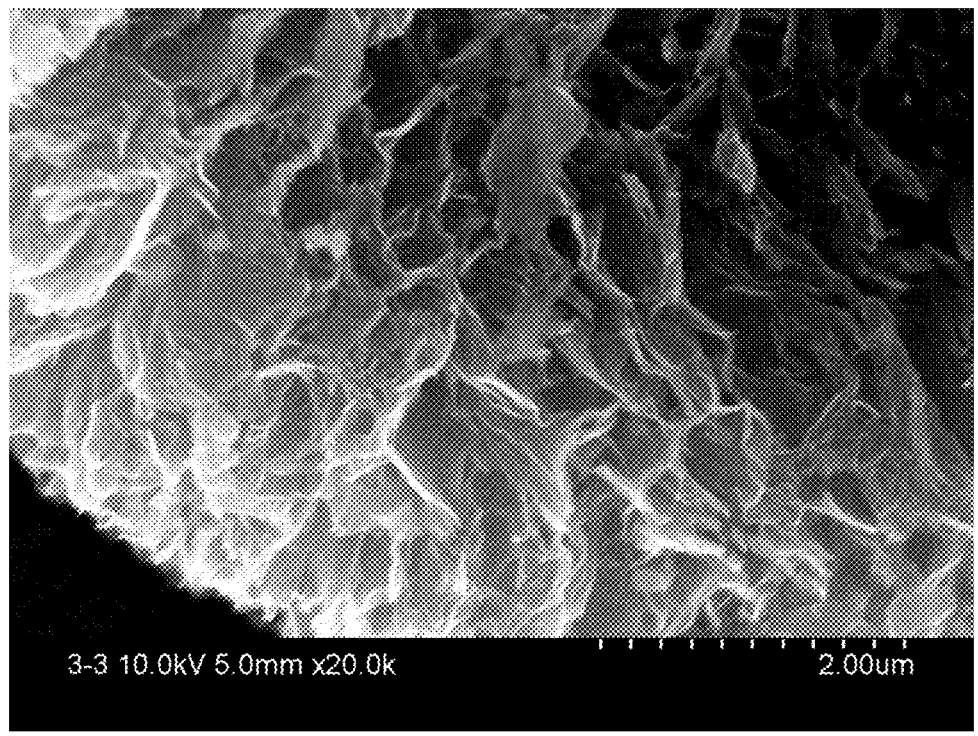
FIG. 1(C) Another SEM image of graphite worms.
Figure 1D:
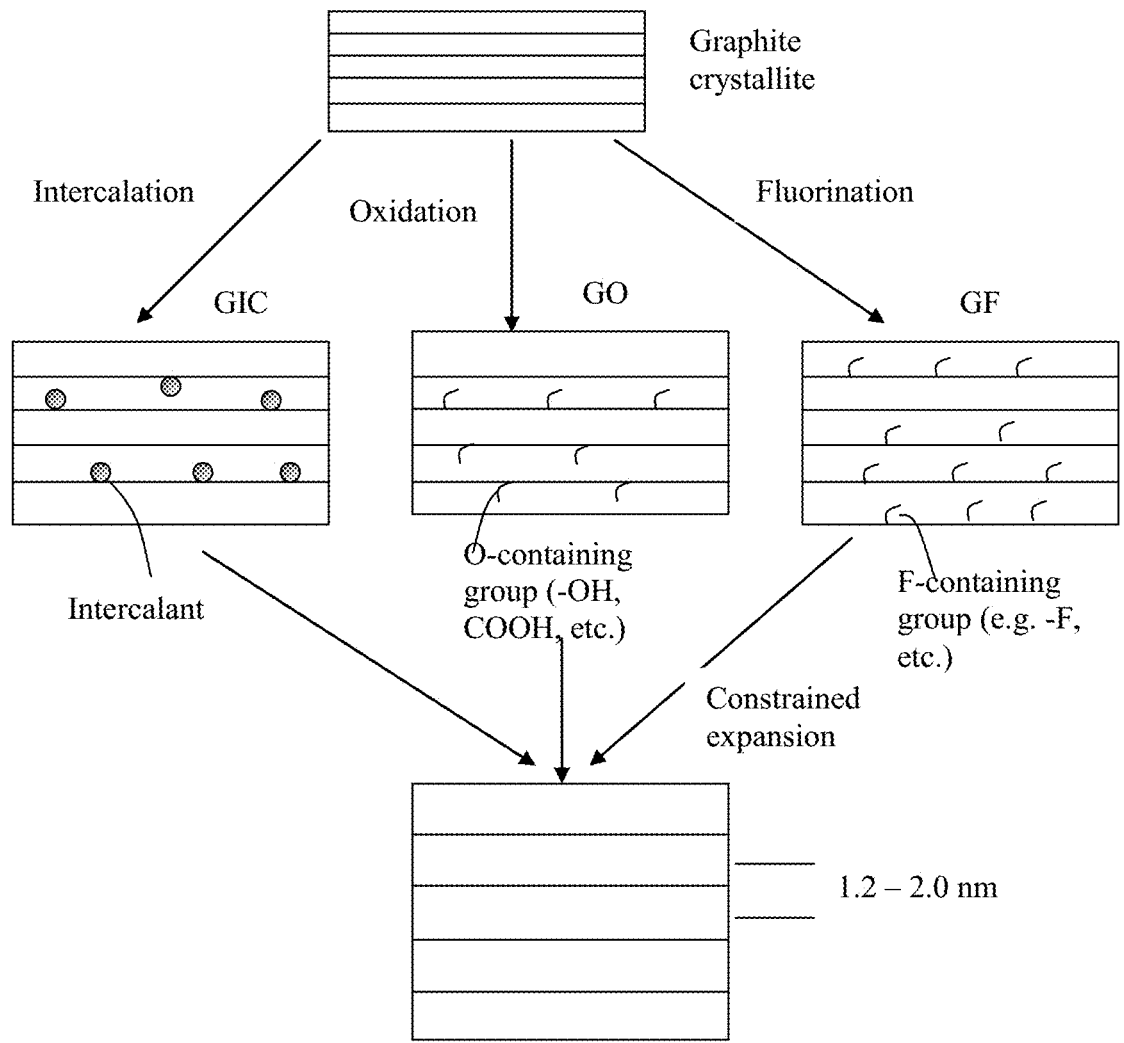
FIG. 1(D) Schematic drawing illustrating the approaches of producing graphite structures containing expanded inter-planar spaces.

Upon exposure of expandable graphite to a temperature in the range of typically 800-1,050° C. for approximately 30 seconds to 2 minutes, the GIC undergoes a rapid volume expansion by a factor of 30-300 to form "exfoliated graphite" or "graphite worms" (104), Graphite worms are each a collection of exfoliated, but largely un-separated graphite flakes that remain interconnected (FIG. 1(B) and FIG. 1(C)). In exfoliated graphite, individual graphite flakes (each containing 1 to several hundred of graphene planes stacked together) are highly spaced from one another, having a spacing of typically 2.0 nm-200 μm. However, they remain physically interconnected, forming an accordion or worm-like structure; hence, the name "graphite worms."

In graphite industry, graphite worms can be re-compressed to obtain flexible graphite sheets or foils (106) that typically have a thickness in the range of 0.1 mm (100 μm)-0.5 mm (500 μm). In the instant invention, a cathode active material or its precursor is incorporated into pores of a mass of graphite worms before this mass is re-compressed to form a cathode layer of a desired porosity level or physical density.

Alternatively, in graphite industry, one may choose to use a low-intensity air mill or shearing machine to simply break up the graphite worms for the purpose of producing the so-called "expanded graphite" flakes (108) which contain mostly graphite flakes or platelets thicker than 100 nm (hence, not a nano material by definition). It is clear that the "expanded graphite" is not "expandable graphite" and is not "exfoliated graphite worm" either. Rather, the "expandable graphite" can be thermally exfoliated to obtain "graphite worms," which, in turn, can be subjected to mechanical shearing to break up the otherwise interconnected graphite flakes to obtain "expanded graphite" flakes.

Alternatively, the exfoliated graphite or graphite worms may be subjected to high-intensity mechanical shearing (e.g. using an ultrasonicator, high-shear mixer, high-intensity air jet mill, or high-energy ball mill) to form separated single-layer and multi-layer graphene sheets (collectively called nano graphene platelets or NGPs, 112), as disclosed in our U.S. application Ser. No. 10/858,814. Single-layer graphene can be as thin as 0.34 nm, while multi-layer graphene can have a thickness up to 100 nm, but more typically less than 3 nm (commonly referred to as few-layer graphene). Multiple graphene sheets or platelets may be made into a sheet of NGP paper (114) using a paper-making process.

In GIC or graphite oxide, the inter-graphene plane separation has been increased from 0.3354 nm in natural graphite to 0.5-1.2 nm in highly oxidized graphite oxide, significantly weakening the van der Waals forces that hold neighboring planes together. Graphite oxide can have an oxygen content of 2%-50% by weight, more typically 20%-40% by weight. GIC or graphite oxide may be subjected to a special treatment herein referred to as "constrained thermal expansion". If GIC or graphite oxide is exposed to a thermal shock in a furnace (e.g. at 800-1,050° C.) and allowed to freely expand, the final product is exfoliated graphite worms. However, if the mass of GIC or graphite oxide is subjected to a constrained condition (e.g. being confined in an autoclave under a constant volume condition or under a uniaxial compression in a mold) while being heated at a temperature from 150° C. to 800° C. (more typically from 300° C. to 600°), the extent of expansion can be constrained and the product can have inter-planar spaces from 1.0 nm to 3.0 nm, or from 1.2 nm to 2.0 nm.

It may be noted that the "expandable graphite" or graphite with expanded inter-planar spacing may also be obtained by forming graphite fluoride (GF), instead of GO. Interaction of $F_2$ with graphite in a fluorine gas at high temperature leads to covalent graphite fluorides, from $(CF)_n$ to $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents (e.g. mixtures of $F_2$ with $Br_2$, $Cl_2$, or $I_2$) may be used, although most of the available literature involves fluorination with $F_2$ gas, sometimes in presence of fluorides.

We have observed that lightly fluorinated graphite, $C_xF$ ($2 \leq x \leq 24$), obtained from electrochemical fluorination, typically has an inter-graphene spacing ($d_{002}$) less than 0.37 nm, more typically <0.35 nm. Only when x in $C_xF$ is less than 2 (i.e. $0.5 \leq x < 2$) can one observe a $d_{002}$ spacing greater than 0.5 nm (in fluorinated graphite produced by a gaseous phase fluorination or chemical fluorination procedure). When x in $C_xF$ is less than 1.33 (i.e. $0.5 \leq x < 1.33$) one can observe a $d_{002}$ spacing greater than 0.6 nm. This heavily fluorinated graphite is obtained by fluorination at a high temperature (>>200° C.) for a sufficiently long time, preferably under a pressure >1 atm, and more preferably >3 atm. For reasons remaining unclear, electrochemical fluorination of graphite leads to a product having a d spacing less than 0.4 nm even though the product $C_xF$ has an x value from 1 to 2. It is possible that F atoms electrochemically introduced into graphite tend to reside in defects, such as grain boundaries, instead of between graphene planes and, consequently, do not act to expand the inter-graphene planar spacing.

The nitrogenation of graphite can be conducted by exposing a graphite oxide material to ammonia at high temperatures (200-400° C.). Nitrogenation may also be conducted at lower temperatures by a hydrothermal method; e.g. by sealing GO and ammonia in an autoclave and then increased the temperature to 150-250° C.

In addition to N, O, F, Br, Cl, or H, the presence of other chemical species (e.g. Na, Li, K, Ce, Ca, Fe, $NH_4$, etc.) between graphene planes can also serve to expand the inter-planar spacing, creating room to accommodate electrochemically active materials therein. The expanded interstitial spaces between graphene planes (hexagonal carbon planes or basal planes) are found by us in this study to be surprisingly capable of accommodating $Al^{+3}$ ions and other anions (derived from electrolyte ingredients) as well. It may be noted that graphite can electrochemically intercalated with such chemical species as Na, Li, K, Ce, Ca, $NH_4$, or their combinations, which can then be chemically or electrochemically ion-exchanged with metal elements (Bi, Fe, Co, Mn, Ni, Cu, etc.). All these chemical species can serve to expand the inter-planar spacing.

The configuration of a multivalent metal secondary battery is now discussed as follows:

A multivalent metal-ion battery includes a positive electrode (cathode), a negative electrode (anode), and an electrolyte typically including a metal salt and a solvent. The anode can be a thin foil or film of a multivalent metal or its alloy with another element(s); e.g. 0-10% by weight of Sn in Zn. The multivalent metal may be selected from Ni, Zn, Be, Mg, Ca, Ba, La, Ti, Ta, Zr, Nb, Mn, V, Co, Fe, Cd, Cr, Ga, In, or a combination thereof. The anode can be composed of particles, fibers, wires, tubes, or discs of the multivalent metal or metal alloy that are packed and bonded together by a binder (preferably a conductive binder) to form an anode layer.

We have observed that a select multivalent metal (e.g. Ni, Zn, Be, Mg, Ca, Ba, La, Ti, Ta, Zr, Mn, V, Co, Fe, Cd, Ga, or Cr), when coupled with a presently invented graphite or carbon material having expanded inter-graphene planar spaces, can exhibit a discharge curve plateau or average output voltage at approximately 1.0 volt or higher. This plateau regime of a discharge voltage vs. time (or capacity) curve enables the battery cell to provide a useful constant voltage output. A voltage output lower than 1 volt is generally considered as undesirable. The specific capacity corresponding to this plateau regime is typically from approximately 100 mAh/g (e.g. for Zr or Ta) to above 600 mAh/g (e.g. for Zn or Mg).

A desirable anode layer structure is composed of a network of electron-conducting pathways (e.g. mat of graphene sheets, carbon nano-fibers, or carbon-nanotubes) and a thin layer of the multivalent metal or alloy coating deposited on surfaces of this conductive network structure. Such an integrated nano-structure may be composed of electrically conductive nanometer-scaled filaments that are interconnected to form a porous network of electron-conducting paths comprising interconnected pores, wherein the filaments have a transverse dimension less than 500 nm. Such filaments may comprise an electrically conductive material selected from the group consisting of electro-spun nano fibers, vapor-grown carbon or graphite nano fibers, carbon or graphite whiskers, carbon nano-tubes, nano-scaled graphene platelets, metal nano wires, and combinations thereof. Such a nano-structured, porous supporting material for the multivalent metal can significantly improve the metal deposition-dissolution kinetics at the anode, enabling high-rate capability of the resulting multivalent metal secondary cell.

Figure 2A:
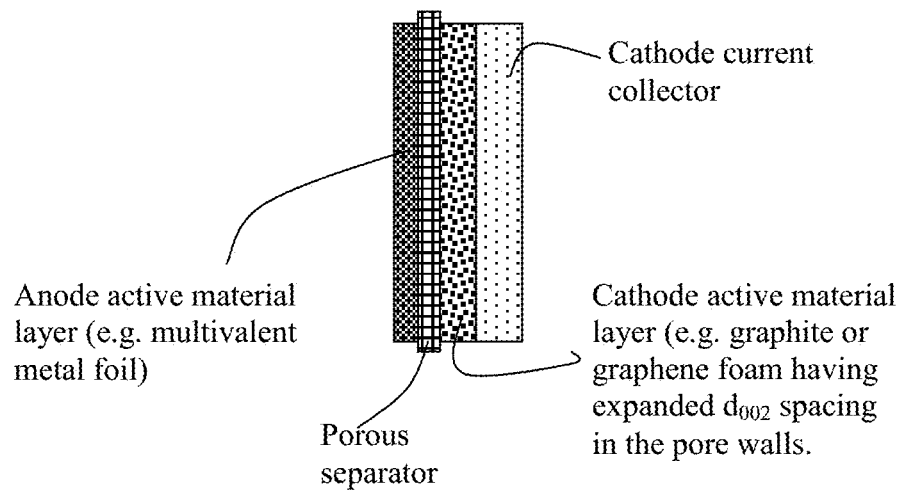
FIG. 2(A) Schematic of a multivalent metal secondary battery, wherein the anode layer is a thin multivalent metal coating or foil and the cathode active material layer contains a layer of graphite foam or graphene foam containing pore walls having expanded inter-planar spaces ($d_{002}$=0.4 nm to 2.0 nm)
Figure 2B:
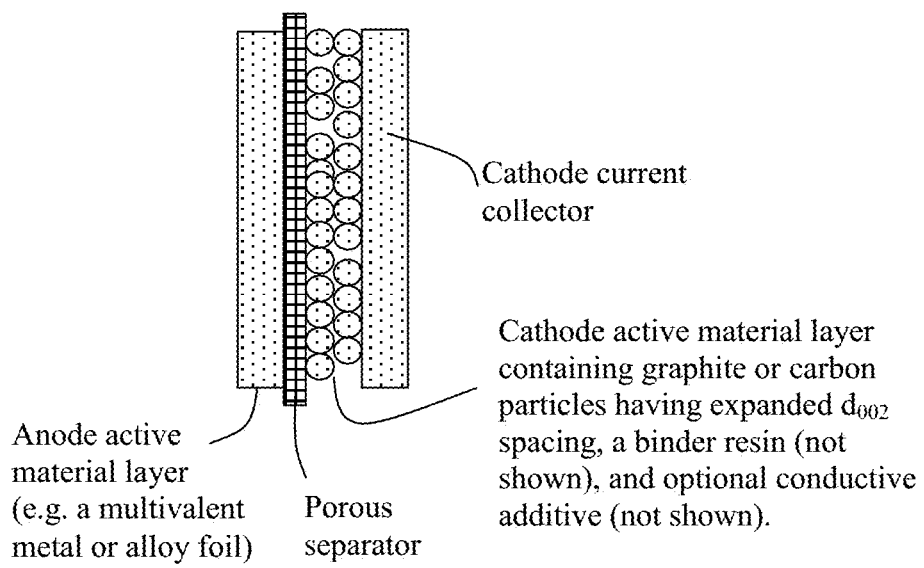
FIG. 2(B) Schematic of a multivalent metal secondary battery cell, wherein the anode layer is a thin multivalent metal coating or foil and the cathode active material layer is composed of particles or fibers of a graphite or carbon material (having expanded inter-planar spaces), a conductive additive (not shown) and a resin binder (not shown).

Illustrated in FIG. 2(A) is a schematic of a multivalent metal secondary battery, wherein the anode layer is a thin multivalent metal coating or foil and the cathode active material layer contains a layer of graphite foam or graphene foam wherein the pore walls contain multiple hexagonal carbon atom planes bonded together having expanded inter-planar spaces ($d_{002}$=0.4 nm to 2.0 nm, more typically from 0.43 nm to 1.2 nm). Alternatively, FIG. 2(B) shows a schematic of a multivalent metal secondary battery cell wherein the cathode active material layer is composed of particles or fibers of a graphite or carbon material (having expanded inter-planar spaces), an optional conductive additive (not shown), and a resin binder (not shown) that helps to bond the particles or fibers together to form a cathode active layer of structural integrity.

The graphite or carbon materials having expanded inter-planar spaces, when implemented as a cathode active material, enable the multivalent metal-ion cell to exhibit a voltage plateau portion in a discharge voltage-time or voltage-capacity curve obtained at a constant current density. This plateau portion typically occurs at a relatively high voltage value intrinsic to a given multivalent metal, and typically lasts a long time, giving rise to a high specific capacity. With a cathode layer of graphite/graphene foam materials featuring pore walls having expanded inter-graphene spacing, the multivalent metal cell typically exhibit a discharge curve having plateau portion, followed by a supercapacitor-type behavior. The supercapacitor-type behavior (EDLC or redox) is due to the high specific surface area of the foamed graphite/graphene material used in the cathode layer.

The composition of the electrolyte, which functions as an ion-transporting medium for charge-discharge reaction, has a great effect on battery performance. To put multivalent metal secondary batteries to practical use, it is necessary to allow metal ion deposition-dissolution reaction to proceed smoothly and sufficiently even at relatively low temperature (e.g., room temperature).

In the invented multivalent metal-ion battery, the electrolyte typically contains a metal salt dissolved in a liquid solvent. The solvent can be water, organic liquid, ionic liquid, organic-ionic liquid mixture, etc. In certain desired embodiments, the metal salt may be selected from $NiSO_4$, $ZnSO_4$, $MgSO_4$, $CaSO_4$, $BaSO_4$, $FeSO_4$, $MnSO_4$, $CoSO_4$, $VSO_4$, $TaSO_4$, $CrSO_4$, $CdSO_4$, $GaSO_4$, $Zr(SO_4)_2$, $Nb_2(SO_4)_3$, $La_2(SO_4)_3$, $MgCl_2$, $AlCl_3$, $Mg(ClO_4)_2$, $Mg(BF_4)_2$, Alkyl Grignard reagents, magnesium dibutyldiphenyl, Mg(BPh2Bu2)2, magnesium tributylphenyl Mg(BPhBu3)2), or a combination thereof.

The electrolyte may in general comprise at least a metal ion salt selected from a transition metal sulphate, transition metal phosphate, transition metal nitrate, transition metal acetate, transition metal carboxylate, transition metal chloride, transition metal bromide, transition metal nitride, transition metal perchlorate, transition metal hexafluorophosphate, transition metal borofluoride, transition metal hexafluoroarsenide, or a combination thereof.

In certain embodiments, the electrolyte comprises at least a metal ion salt selected from a metal sulphate, phosphate, nitrate, acetate, carboxylate, chloride, bromide, nitride, or perchlorate of zinc, aluminum, titanium, magnesium, calcium, manganese, cobalt, nickel, iron, vanadium, tantalum, gallium, chromium, cadmium, niobium, zirconium, lanthanum, or a combination thereof.

In the multivalent metal-ion battery, the electrolyte comprises an organic solvent selected from ethylene carbonate (EC), dimethyl carbonate (DMC), methylethyl carbonate (MEC), diethyl carbonate (DEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), tetrahydrofuran (THF), toluene, xylene, methyl acetate (MA), or a combination thereof.

This invention is directed at the cathode active layer (positive electrode layer) containing a high-capacity cathode material for the multivalent metal secondary battery. The invention also provides such a battery based on an aqueous electrolyte, a non-aqueous electrolyte, a molten salt electrolyte, a polymer gel electrolyte (e.g. containing a metal salt, a liquid, and a polymer dissolved in the liquid), or an ionic liquid electrolyte. The shape of a multivalent metal secondary battery can be cylindrical, square, button-like, etc. The present invention is not limited to any battery shape or configuration.

The following examples are used to illustrate some specific details about the best modes of practicing the instant invention and should not be construed as limiting the scope of the invention.

Example 1

Oxidation of Graphite to Produce Graphite With Expanded Inter-Planar Spacing

Natural flake graphite, nominally sized at 45 provided by Asbury Carbons (405 Old Main St., Asbury, N.J. 08802, USA) was milled to reduce the size to approximately 14 (Sample 1a). The chemicals used in the present study, including fuming nitric acid (>90% concentration), sulfuric acid (95-98%), potassium chlorate (98%), and hydrochloric acid (37%), were purchased from Sigma-Aldrich and used as received. Graphite oxide (GO) samples were prepared according to the following procedure:

Sample 1A: A reaction flask containing a magnetic stir bar was charged with sulfuric acid (176 mL) and nitric acid (90 mL) and cooled by immersion in an ice bath. The acid mixture was stirred and allowed to cool for 15 min, and graphite (10 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 24 hours at room temperature. On completion of the reaction, the mixture was poured into 8 L of deionized water and filtered. The GO was re-dispersed and washed in a 5% solution of HCl to remove sulphate ions. The filtrate was tested intermittently with barium chloride to determine if sulphate ions are present. The HCl washing step was repeated until this test was negative. The GO was then washed repeatedly with deionized water until the pH of the filtrate was neutral. The GO slurry was spray-dried and stored in a vacuum oven at 60° C. until use.

Sample 1B: The same procedure as in Sample 1A was followed, but the reaction time was 48 hours.

Sample 1C: The same procedure as in Sample 1A was followed, but the reaction time was 96 hours.

X-ray diffraction studies showed that after a treatment of 24 hours, a significant proportion of graphite has been transformed into graphite oxide. The peak at $2θ=26.3$ degrees, corresponding to an inter-planar spacing of 0.335 nm (3.35 Å) for pristine natural graphite was significantly reduced in intensity after a deep oxidation treatment for 24 hours and a peak typically near $2θ=9-14$ degrees (depending upon degree of oxidation) appeared. In the present study, the curves for treatment times of 48 and 96 hours are essentially identical, showing that essentially all of the graphite crystals have been converted into graphite oxide with an inter-planar spacing of 6.5-7.5 Å (the 26.3 degree peak has totally disappeared and a peak of approximately at $2θ=11.75-13.7$ degrees appeared).

Example 2

Oxidation and Intercalation of Various Graphitic Carbon and Graphite Materials

Samples 2A, 2B, 2C, and 2D were prepared according to the same procedure used for Sample 1B, but the starting graphite materials were pieces of highly oriented pyrolytic graphite (HOPG), graphite fiber, graphitic carbon nano-fiber, and spheroidal graphite, respectively. Their final inter-planar spacing values are 6.6 Å, 7.3 Å, 7.3 Å, and 6.6 Å, respectively. Their un-treated counterparts are referred to as Sample 2a, 2b, 2c, and 2d, respectively.

Example 3

Preparation of Graphite Oxide Using a Modified Hummers' Method

Graphite oxide (Sample 3A) was prepared by oxidation of natural graphite flakes (original size of 200 mesh, milled to approximately 15 μm, referred to as Sample 3a) with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 35° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The interlayer spacing of the resulting laminar graphite oxide was determined by the Debye-Scherrer X-ray technique to be approximately 0.73 nm (7.3 Å).

Example 4

Preparation of Oxidized Meso-Carbon Micro-Beads (MCMBs) Having Expanded Inter-Planar Spaces Graphite oxide (Sample 4A) was prepared by oxidation of meso-carbon micro-beads (MCMBs) according to the same procedure used in Example 3. MCMB microbeads (Sample 4a) were supplied by China Steel Chemical Co. This material has a density of about 2.24 g/cm$^3$, an average particle size of 16 µm, and an inter-planar distance of about 0.336 nm. After deep oxidation treatment, the inter-planar spacing in the resulting graphite oxide micro-beads is approximately 0.76 nm.

Example 5

Bromination and Fluorination of Carbon Fibers

Graphitized carbon fiber (Sample 5a), having an inter-planar spacing of 3.37 Å (0.337 nm) and a fiber diameter of 10 µm was first halogenated with a combination of bromine and iodine at temperatures ranging from 75° C. to 115° C. to form a bromine-iodine intercalation compound of graphite as an intermediate product. The intermediate product was then reacted with fluorine gas at temperatures ranging from 275° C. to 450° C. to form the $CF_y$. The value of y in the $CF_y$ samples was approximately 0.6-0.9. X-ray diffraction curves typically show the co-existence of two peaks corresponding to 0.59 nm and 0.88 nm, respectively. Sample 5A exhibits substantially 0.59 nm peak only and Sample 5B exhibits substantially 0.88 nm peak only.

Example 6

Fluorination of Carbon Fibers

A $CF_{0.68}$ sample obtained in EXAMPLE 5 was exposed at 250° C. and 1 atmosphere to vapors of 1,4-dibromo-2-butene ($BrH_2C-CH=CH-CH_2Br$) for 3 hours. It was found that two-thirds of the fluorine was lost from the graphite fluoride sample. It is speculated that 1,4-dibromo-2-butene actively reacts with graphite fluoride, removing fluorine from the graphite fluoride and forming bonds to carbon atoms in the graphite lattice. The resulting product (Sample 6A) is mixed halogenated graphite, likely a combination of graphite fluoride and graphite bromide.

Example 7

Fluorination of Graphite

Natural graphite flakes, a sieve size of 200 to 250 mesh, were heated in vacuum (under less than 10$^{-2}$ mmHg) for about 2 hours to remove the residual moisture contained in the graphite. Fluorine gas was introduced into a reactor and the reaction was allowed to proceed at 375° C. for 120 hours while maintaining the fluorine pressure at 200 mmHg. This was based on the procedure suggested by Watanabe, et al. disclosed in U.S. Pat. No. 4,139,474. The powder product obtained was black in color. The fluorine content of the product was measured as follows: The product was burnt according to the oxygen flask combustion method and the fluorine was absorbed into water as hydrogen fluoride. The amount of fluorine was determined by employing a fluorine ion electrode. From the result, we obtained a GF (Sample 7A) having an empirical formula $(CF_{0.75})_n$. X-ray diffraction indicated a major (002) peak at 2θ=13.5 degrees, corresponding to an inter-planar spacing of 6.25 Å.

Sample 7B was obtained in a manner similar to that for Sample 7A, but at a reaction temperature of 640° C. for 5 hours. The chemical composition was determined to be $(CF_{0.93})_n$. X-ray diffraction indicated a major (002) peak at 2θ=9.5 degrees, corresponding to an inter-planar spacing of 9.2 Å.

Example 8

Preparation of Carbon-Coated GO Particles

Two polymeric carbon-coated GO samples (Samples 8-A and 8-B) were prepared by mixing GO particles (prepared in Example 3 and Example 4, respectively) with a phenol resin to obtain a mixture comprising 20% by volume of phenol resin in each case. The mixture was cured at 200° C. for one hour and then carbonized in an argon atmosphere at a temperature of 500° C. under a constant-volume condition. Then, the carbonized product was ground and milled to obtain particles of 1 to 23 µm, with an average diameter of approximately 13 µm. The inter-planar spacing was determined to be approximately 0.73 nm and 0.76 nm, respectively, prior to the constrained expansion treatment. After this constrained expansion treatment, the d spacing of the GO particles was increased to 1.27 nm and 1.48 nm, respectively (Samples 8-C and 8-D).

Example 9

Preparation of Carbon-Coated GF Particles

Natural flake graphite, milled to an average size of approximately 14 microns, was subjected to the same fluorination treatment as described in Example 7 and determined to be $(CF_{0.75})_n$ (Sample 7B). The resulting powder was subjected to a chemical vapor deposition (CVD) of amorphous carbon according to a procedure suggested by Tanaka, et al., U.S. Pat. No. 5,344,726. A $(CF_{0.75})_n$ sample powder of 50 mg was placed in a quartz tube reactor, and then argon gas and propane gas were supplied from an argon supply line and a propane supply line, respectively. Then, a propane concentration of raw gas was set to 10 mole % by handling needle valves. Flow velocity of the raw gas was set to 12.7 cm/min and an amount of supply of propane was set to 0.05 mol/h. It may be noted that a hydrocarbon or its derivatives other than propane may be used as a raw material. More specifically, an aliphatic hydrocarbon, an aromatic hydrocarbon, an alicyclic hydrocarbon or the like may be used. Further specifically, methane, ethane, butane, benzene, toluene, naphthalene, acetylene, biphenyl and substitution products thereof may be used. The powder was heated by a furnace at approximately 750° C. under a constant-volume condition, whereby propane supplied from a pyrex tube was pyrolytically decomposed with a pyrolysis carbon being deposited on the surface of the graphite fluoride powder. The resulting material was milled to become fine particles of approximately 16.5 microns, which are essentially amorphous carbon-coated GF particles (Sample 9B).

Example 10

Preparation of Graphene Foam Having Pore Walls With Expanded Inter-Planar Spaces In one sample, five grams of the graphite oxide were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO was effectively exfoliated and separated into thin graphene oxide sheets with oxygen content of approximately 23%-31% by weight. The resulting suspension contains GO sheets being suspended in water. A chemical blowing agent (hydrazo dicarbonamide) was added to the suspension just prior to casting.

The resulting suspension was then cast onto a glass surface using a doctor's blade to exert shear stresses, inducing GO sheet orientations. The resulting GO coating films, after removal of liquid, have a thickness that can be varied from approximately 5 to 500 µm (preferably and typically from 10 µm to 50 µm).

For making a graphene foam specimen, the GO coating film was then subjected to heat treatments that typically involve an initial thermal reduction temperature of 80-350° C. for 1-8 hours, followed by heat-treating at a second temperature of 1,500-2,850° C. for 0.5 to 5 hours.

Several pieces of GO-derived graphene foam were subsequently subjected to oxidation treatment to produce GO foam containing graphene pore walls having expanded inter-planar spaces.

Example 11

Preparation of Graphite Foam Having Pore Walls with Expanded Inter-Planar Spaces Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

Several pieces of graphite foam were subjected to fluorination to obtain graphite fluoride foam according to the procedure used in Example 7. The pore walls in the foam have expanded spacing, 5.3-7.2 nm.

Example 12

Preparation and Testing of Various Multivalent Metal-Ion Cells

The particles or fibers of carbon or graphite materials prepared in Examples 1-8 were separately made into a cathode layer and incorporated into a metal-ion secondary battery. The cathode layer was prepared in the following way. First of all, 95% by weight of the carbon or graphite powder having expanded inter-planar spaces were mixed together with PVDF (a binder) in NMP to obtain a slurry mixture. The slurry mixture was then cast onto a glass surface to make a wet layer, which was dried to obtain a cathode layer. Layers of graphite foam or graphene foam were directly used as a cathode active layer.

Two types of multivalent metal anode were prepared. One was metal foil having a thickness from 20 µm to 300 µm. The other was metal thin coating deposited on surfaces of conductive nano-filaments (e.g. CNTs) or graphene sheets that form an integrated 3D network of electron-conducting pathways having pores and pore walls to accept a multivalent metal or its alloy. Either the metal foil itself or the integrated 3D nano-structure also serves as the anode current collector.

Cyclic voltammetry (CV) measurements were carried out using an Arbin electrochemical workstation at a typical scanning rate of 0.5-50 mV/s. In addition, the electrochemical performances of various cells were also evaluated by galvanostatic charge/discharge cycling at a current density from 50 mA/g to 10 A/g. For long-term cycling tests, multi-channel battery testers manufactured by LAND were used.

Figure 3A:
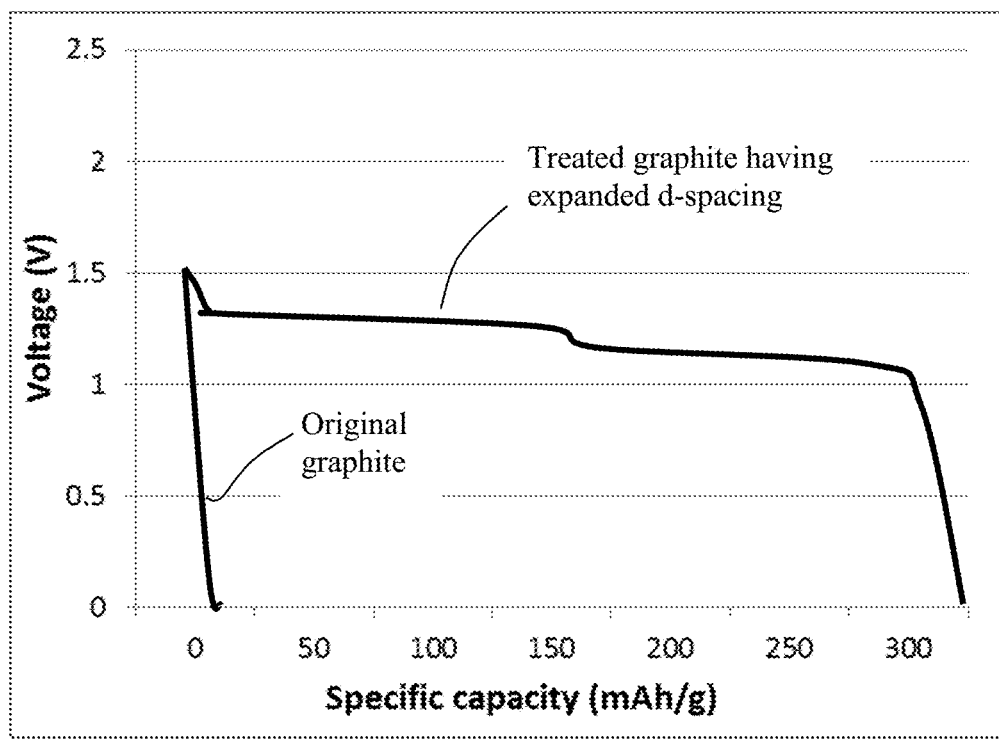
FIG. 3(A) The discharge curves of two Zn foil anode-based cells; one containing a cathode layer of original graphite particles and the other a cathode layer of expansion-treated graphite particles having expanded inter-planar spaces.

FIG. 3(A) shows the charge and discharge curves of two Zn foil anode-based cells: one having a cathode layer of original graphite particles (d-spacing=0.3359 nm) and the other having a cathode layer of expansion-treated graphite (d-spacing=0.62 nm). The electrolyte used was 1M of $ZnSO_4$ in water. These data indicate that the original graphite has very little Zn ion storage capability; the non-zero, but minimal capability being likely associated with surface adsorption or electroplating of Zn on graphite particle surfaces (specific capacity<5 $m^2$/g). In contrast, the expanded inter-planar spaces appear to be capable of admitting and storing large amounts of Zn ions, possibly along with other ions dissociated from the electrolyte. The discharge curve exhibits a long plateau regime at 1.15-1.35 volts and a specific capacity as high as nearly 300 mAh/g. The resulting cell-level energy density is approximately 125 Wh/kg, very close to those of lithium-ion batteries. Zinc is more abundant, safer, and significantly less expensive than lithium, nevertheless.

Figure 3B:
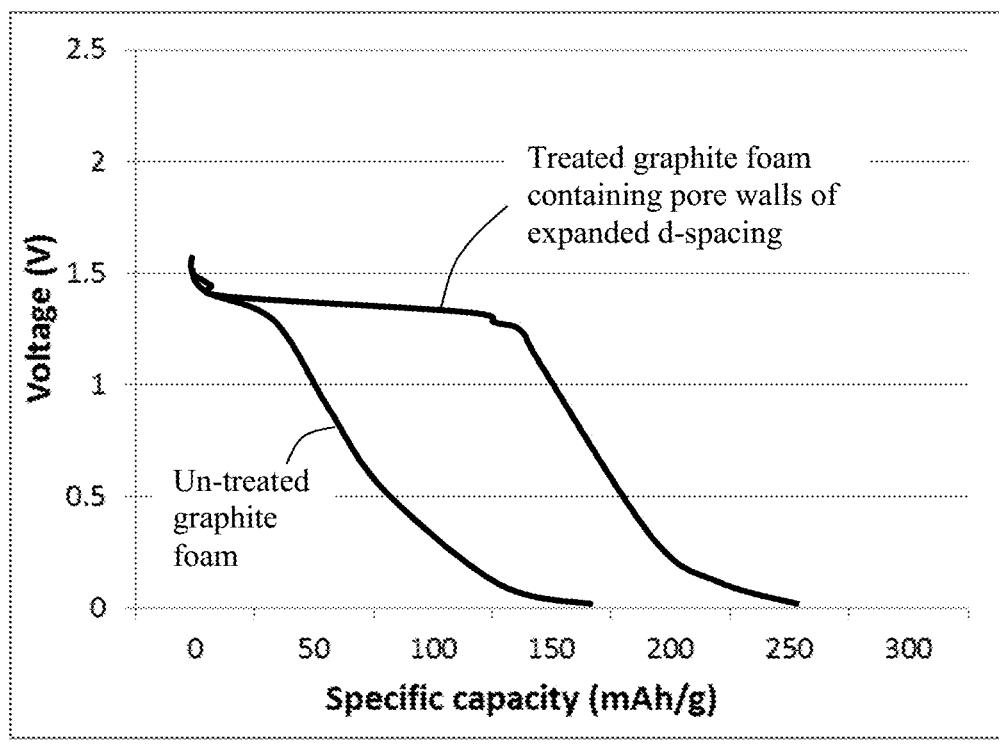
FIG. 3(B) The discharge curves of two Zn foil anode-based cells; one containing a cathode layer of graphite foam having conventional pore walls (d-spacing<0.34 nm) and the other a cathode layer of expansion-treated graphite foam containing pore walls having expanded inter-planar spaces.

FIG. 3(B) shows the discharge curves of two Zn foil anode-based cells each having a graphite foam-based cathode (one with expanded inter-planar spaces and one without). These data indicate that the presently invented cathode layer of graphite foam containing pore walls having expanded inter-planar spacing exhibits an initial plateau regime corresponding to Zn ion intercalation and a slopping curve portion corresponding to adsorption of Zn ions or other electrolyte-derived ions on graphite pore walls. The cell has a significantly higher specific capacity (250 mAh/g) as compared to the cathode featuring conventional graphite foam having no expanded d-spacing (169 mAh/g). The latter is only capable of storing Zn ions via the surface adsorption or electroplating mechanism. It is clear that by expanding the inter-planar spacing, one opens up other energy storage opportunities. This is truly unexpected and has great utility value.

Summarized in Table 1 below are the typical plateau voltage ranges of the discharge curves of a broad array of multivalent metal-ion cells using natural graphite, artificial graphite, or graphite fiber having expanded d-spacing as a cathode active material. The specific capacity is typically from 100 to 650 mAh/g. In contrast, for each type of battery cell, the corresponding graphite or carbon material having unexpanded d-spacing does not enable any significant voltage plateau regime and does not provide any significant ion storage capability (typically <50 mAh/g).

TABLE 1

Plateau voltage ranges of the discharge curves in multivalent metal-ion cells.

| Anode Metal | Voltage range |
| --- | --- |
| Ba | 3.35-3.55 V |
| Ca | 3.21-3.35 V |
| La | 2.82-3.05 V |
| Mg | 2.80-3.01 V |
| Be | 2.32-2.51 V |
| Ti | 2.13-2.22 V |
| Zr | 1.95-2.07 V |
| Mn | 1.76-1.85 V |
| V | 1.72-1.82 V |
| Nb | 1.65-1.73 V |
| Zn | 1.15-1.35 V |
| Cr | 1.10-1.31 V |
| Ta | 1.12-1.25 V |
| Ga | 1.08-1.18 V |
| Fe | 0.94-1.13 V |
| Cd | 0.92-1.10 V |
| Co | 0.85-0.98 V |
| Ni | 0.80-0.95 V |

Figure 4:
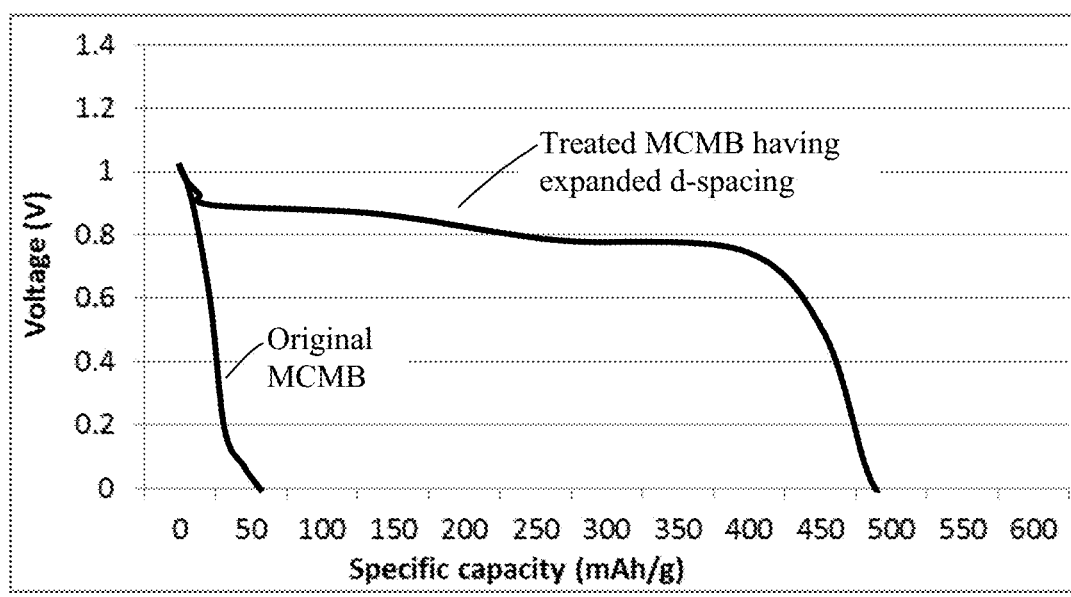
FIG. 4 The discharge curves of two Ni mesh anode-based cells; one containing a cathode layer of original MCMB particles and the other a cathode layer of expansion-treated MCMB particles having expanded inter-planar spaces.

Shown in FIG. 4 are discharge curves of two Ni mesh anode-based Ni-ion cells, one containing a cathode layer of original MCMB particles and the other a cathode layer of expansion-treated MCMB particles having expanded inter-planar spaces. The expanded spaces enable the MCMB beads to admit (via intercalation) and store a large amount of ions (up to 490 mAh/g). In contrast, the original MCMB beads with unexpanded inter-planar spacing stores a very limited amount of Ni ions, mostly due to electroplating at very low voltage levels. There is typically very short or no plateau regime in a charge or discharge curve for a multivalent metal-graphite/carbon cell having unexpanded d-spacing.

Figure 5:
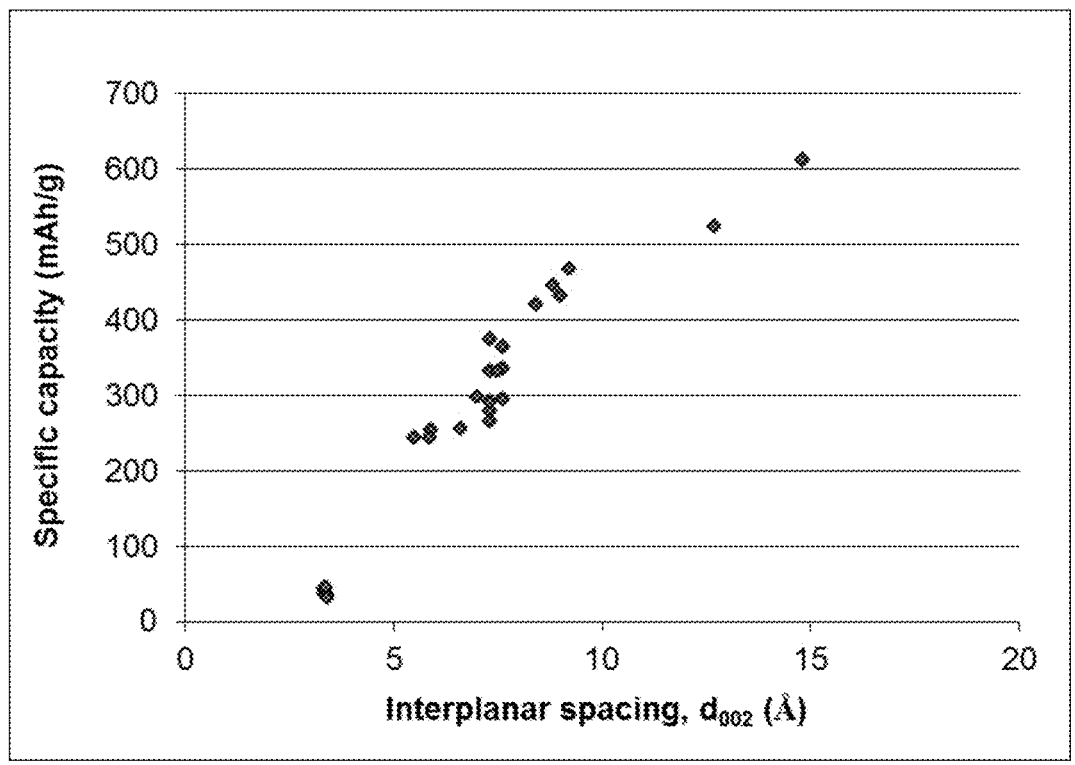
FIG. 5 The specific capacity values of a wide variety of carbon or graphite materials (used as a cathode active material in a Ni-ion cell) plotted as a function of the inter-planar spacing.

FIG. 5 show the specific capacity values of Ni-ion cells containing a cathode layer of a wide variety of carbon or graphite materials plotted as a function of the inter-planar spacing. It is clear that the amount of Ni ions or other ions that can be stored in a carbon/graphite cathode material scales with the inter-planar spacing.

The carbon or graphite material types, their respective inter-planar spacing values and specific capacity values when used as a cathode active material for Zn-ion, V-ion, and Mg-ion cells are summarized in Table 2 below:

TABLE 2

A list of carbon or graphite materials used as the cathode active material of an Al cell.

| Sample No. | Material | Inter-planar spacing, Å | Specific capacity, mAh/g (Zn) | Specific capacity, mAh/g (V) | Specific capacity, mAh/g (Mg) |
| --- | --- | --- | --- | --- | --- |
| 1a | Natural graphite | 3.35 | 22 | | 25 |
| 1A | GO, 24 hrs | 5.5 | 245 | | 224 |
| 1B | GO, 48 hrs | 7 | 326 | | 298 |
| 1C | GO, 96 hrs | 7.6 | 358 | | 288 |
| 2a | HOPG | 3.35 | 21 | | 27 |
| 2A | HOPG oxide | 6.6 | 305 | | 213 |
| 2b | Graphite fiber | 3.4 | 16 | | 32 |
| 2B | Oxidized GF | 7.3 | 344 | | 214 |
| 2c | CNF | 3.36 | 45 | | 77 |
| 2C | Oxidized CNF | 7.3 | 352 | | 281 |
| 3a | Natural graphite | 3.35 | | 17 | |
| 3A | GO, Hummers | 7.3 | | 232 | |
| 4a | MCMB | 3.36 | | 22 | |
| 4A | Oxidized MCMB | 7.6 | | 278 | |
| 5a | Graphite fiber | 3.4 | | 16 | |
| 5A | $CF_{0.9}$ | 8.8 | | 368 | |
| 5B | $CF_{0.6}$ | 5.9 | | 213 | |
| 6A | $CBrF_x$ | 8.4 | | 354 | |
| 7A | $CF_{0.75}$ | 5.85 | | 211 | |
| 7B | $CF_{0.93}$ | 9.2 | | 433 | |
| 8A | 3A + C-coated | 7.3 | | | 288 |
| 8B | 4A + C-coated | 7.6 | | | 292 |
| 8C | Constrained expansion | 12.7 | | 487 | 421 |
| 8D | Constrained expansion | 14.8 | | 554 | 513 |

The following significant observations are made from Table 1 and related charts (FIG. 5-FIG. 8):

(1) In every group of carbon or graphite material used in the cathode of a multivalent metal-ion battery, the specific capacity of the cathode materials with expanded interstitial spaces (inter-planar spacing greater 0.45 nm or 4.5 Å) are significantly higher than those of their un-expanded-spacing counterparts. For instance, 1A, 1B, 1C, and 1D (graphite oxide) are all greater than 1a (natural graphite).

(2) The total specific capacity increases with increasing inter-planar spacing. The present invention provides a powerful platform technology for enhancing the specific capacity of carbon or graphite cathode materials implemented in a multivalent metal-ion battery.

(3) The data for Samples 8C, and 8D demonstrate that a constrained expansion of an intercalated or fluorinated/oxidized carbon/graphite material can further expand the interstitial spaces, leading to a significantly higher charge storage capacity.

Figure 6:
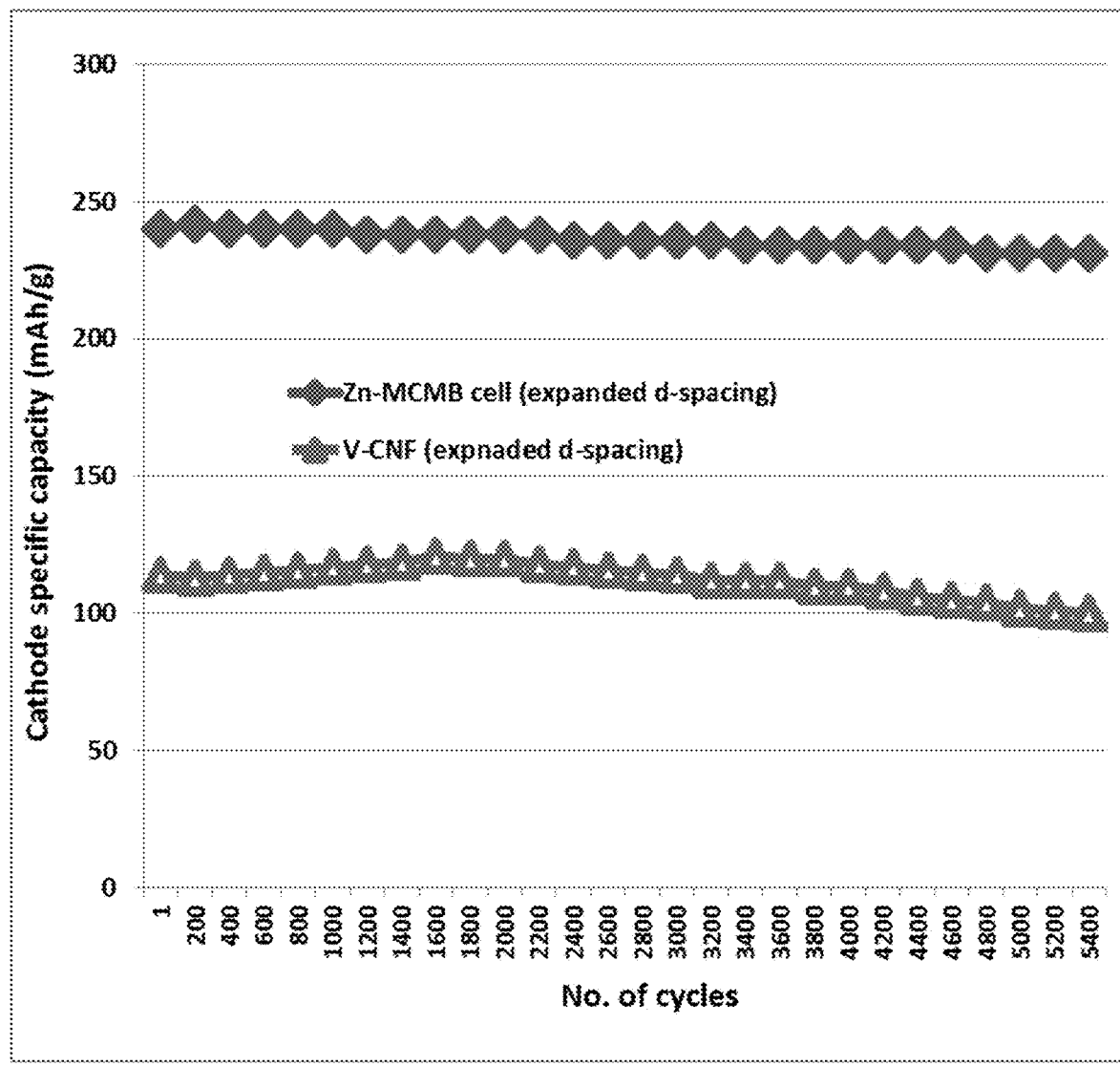
FIG. 6 The specific capacity of a Zn-MCMB cell (containing a cathode layer of MCMB particles with expanded inter-planar spaces) and a V-CNF (containing a cathode of vapor grown carbon nanofibers with expanded inter-planar spaces), both plotted as a function of the number of charge/discharge cycles.

(4) As demonstrated in FIG. 6, both the Zn-MCMB cell (containing a cathode layer of MCMB particles with expanded inter-planar spaces) and the Vanadium-CNF cell (containing a cathode of vapor grown carbon nanofibers with expanded inter-planar spaces) show exceptionally stable cycle life, exhibiting less than 10% and 15% capacity degradation, respectively, after 5,000 charge-discharge cycles. The cycle life of the presently invented multivalent metal-ion cell is typically significantly higher than the cycle life of the lithium-ion battery.

Figure 7:
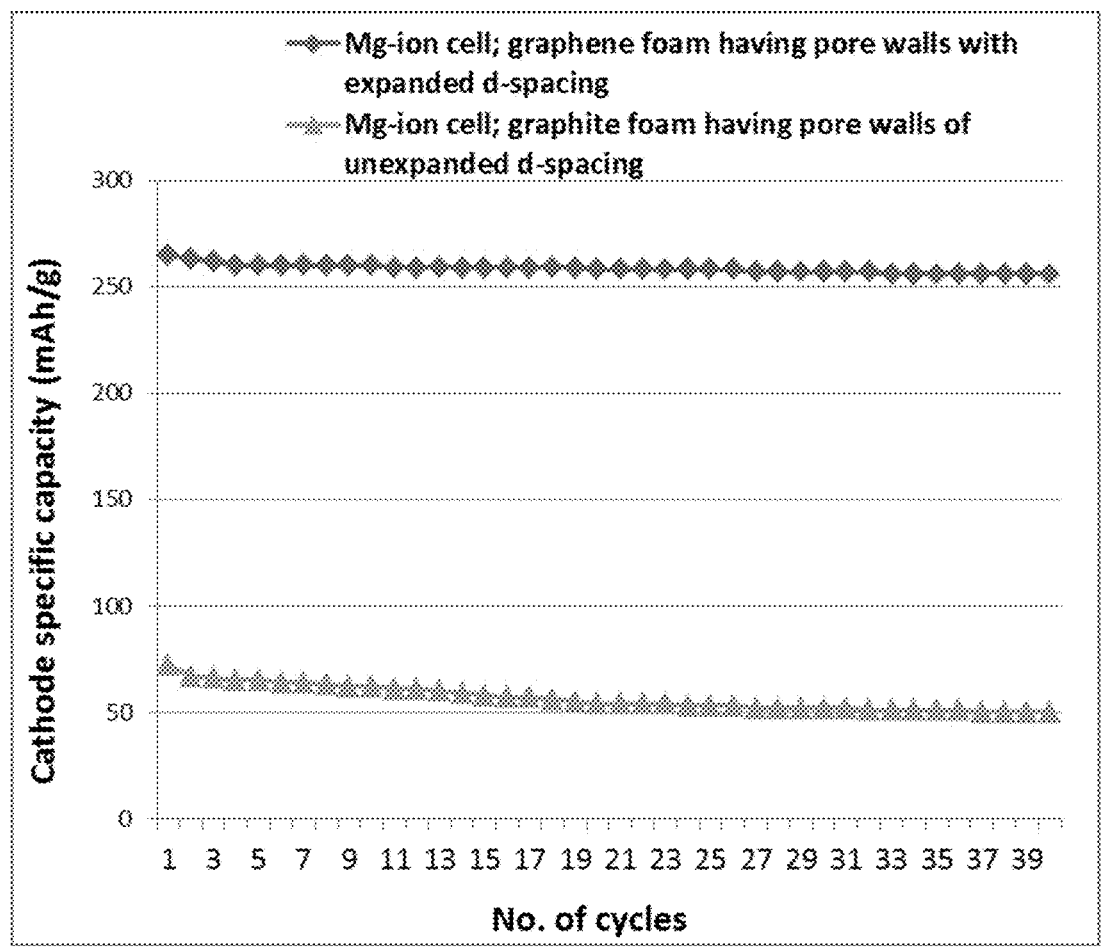
FIG. 7 The specific capacity of a Mg-ion cell containing a cathode layer of graphene foam of multi-layer graphene pore walls with expanded inter-planar spaces and that of a Mg-ion cell containing a cathode of graphite foam of pore walls having un-expanded inter-planar spaces, both plotted as a function of the number of charge/discharge cycles. The electrolyte used was 1 M of $MgCl_2$:$AlCl_3$ (2:1) in monoglyme.

(5) FIG. 7 shows that the Mg-ion cell containing a cathode layer of graphene foam of multi-layer graphene pore walls with expanded inter-planar spaces delivers a significantly higher specific capacity and a more stable cycling behavior as compared to the Mg-ion cell containing a cathode of graphite foam of pore walls having un-expanded inter-planar spaces.

Figure 8:
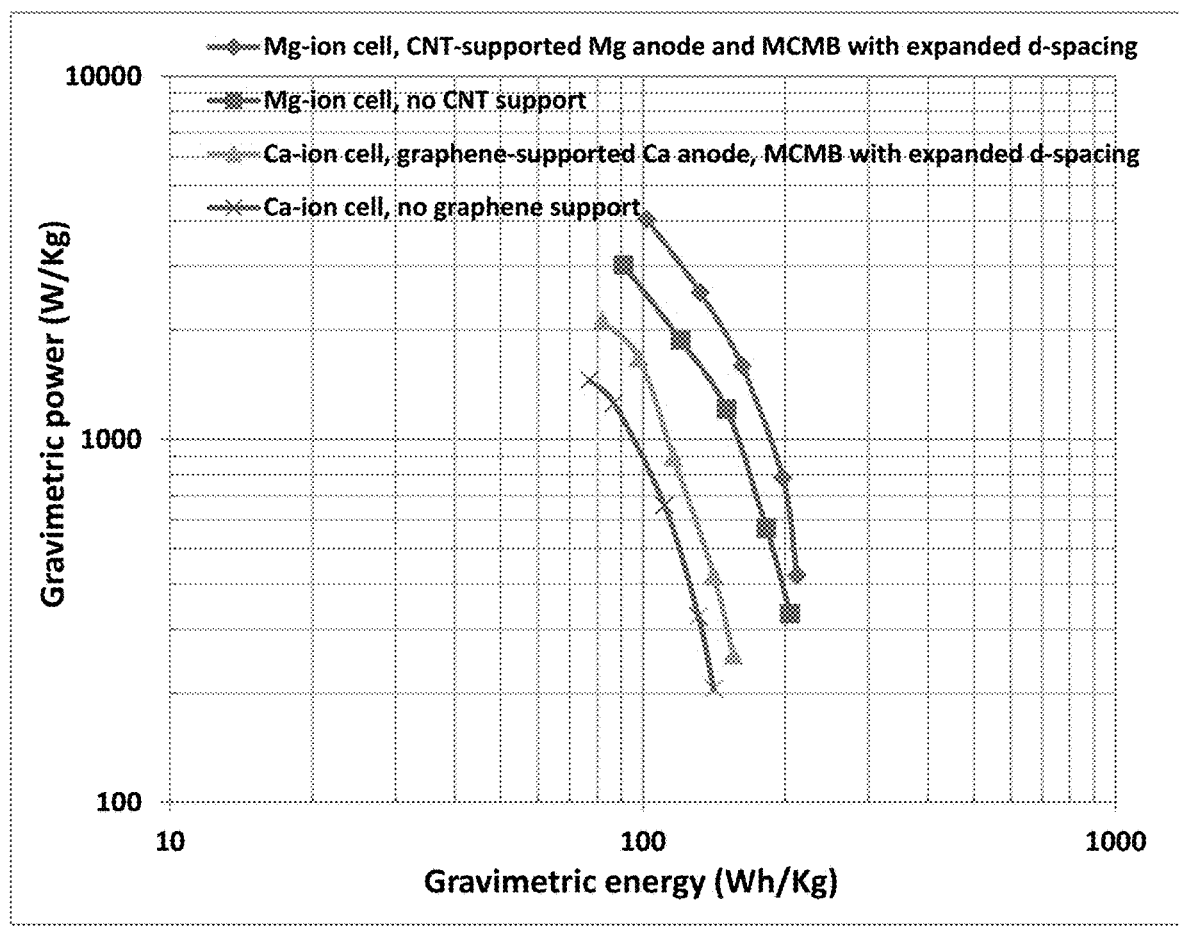
FIG. 8 Ragone plots of Mg-ion cells (electrolyte=1 M of tris(pentafluorophenyl)borane in tetrahydrofuran, 25° C.) and Ca-ion cells (electrolyte=0.45 M $Ca(BF_4)_2$ in EC:PC at 80° C.); the anode being Mg or Ca metal supported or unsupported by CNTs and graphene foam, respectively.

(6) Additionally, we have observed that by supporting the multivalent metal (in a thin film or coating form) on a nano-structured network composed of interconnected carbon or graphite filaments (e.g. carbon nanotubes or graphene sheets) one can significantly increase the power density and high-rate capability of a metal-ion cell. This is illustrated in FIG. 8, which provides Ragone plots of four cells: a Mg-ion cell having a CNT-supported Mg anode and a cathode layer containing MCMB beads having expanded d-spacing, a Mg-ion cell having a Mg foil anode (no CNT support) and a cathode layer containing MCMB beads having expanded d-spacing, a Ca-ion cell having a graphene-supported Ca anode and a cathode layer containing MCMB beads having expanded d-spacing, and a Ca-ion cell having a Ca anode (no graphene support) and a cathode layer containing MCMB beads having expanded d-spacing. Both Mg-ion cells and Ca-ion cells deliver energy densities comparable to those of lithium-ion batteries, but higher power densities. The power density values are comparable to those of supercapacitors. In other words, the presently invented multivalent metal-ion batteries have the best of both worlds of lithium-ion batteries and supercapacitors.

This nano-structured network of interconnected carbon nano-fibers provides large surface areas to support multivalent metal and facilitate fast and uniform dissolution and deposition of metal cations at the anode side. Other nano-filaments or nano-structures that can be used to make such a network include electro-spun nano fibers, vapor-grown carbon or graphite nano fibers, carbon or graphite whiskers, carbon nano-tubes, nano-scaled graphene platelets, metal nano wires, or a combination thereof.

We claim:

1. A multivalent metal-ion battery comprising:
   an anode,
   a cathode, and
   an electrolyte in ionic contact with said anode and said cathode,
   wherein said anode contains, as an anode active material, a multivalent metal or alloy, selected from Be, La, Ta, Zr, Nb, or a combination thereof, and
   wherein said cathode comprises a cathode active layer of a graphite or carbon material having expanded inter-graphene planar spaces with an inter-planar spacing $d_{002}$ from 0.43 nm to 2.0 nm as measured by X-ray diffraction;
   wherein said electrolyte contains $NiSO_4$, $ZnSO_4$, $FeSO_4$, $MnSO_4$, $CoSO_4$, $VSO_4$, $TaSO_4$, $CrSO_4$, $CdSO_4$, $GaSO_4$, $Zr(SO_4)_2$, $Nb_2(SO_4)_3$, $La_2(SO_4)_3$, $BeCl_2$, $Be(BF_4)_2$, Grignard reagents, tri(3,5-dimethylphenyl borane, magnesium dibutyldiphenyl, Mg(BPh2Bu2)2, magnesium tributylphenyl Mg(BPhBu3)2), or a combination thereof.

2. The multivalent metal-ion battery of claim 1, wherein said carbon or graphite material in said cathode active layer is selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nano-tubes, carbon nano-fibers, carbon fibers, graphite nano-fibers, graphite fibers, carbonized polymer fibers, or a combination thereof, wherein said carbon or graphite material has an inter-planar spacing $d_{002}$ in a range of 0.27 nm to 0.42 nm prior to a chemical or physical expansion treatment and the inter-planar spacing $d_{002}$ is increased to a range of 0.43 nm to 2.0 nm after said expansion treatment.

3. The multivalent metal-ion battery of claim 1, wherein said carbon or graphite material is selected from graphite foam or graphene foam having pores and pore walls, wherein said pore walls contain a stack of bonded graphene planes having an expanded inter-planar spacing $d_{002}$ from 0.45 nm to 1.5 nm.

4. The multivalent metal-ion battery of claim 3, wherein said stack contains from 2 to 100 graphene planes.

5. The multivalent metal-ion battery of claim 1, wherein said inter-planar spacing $d_{002}$ is from 0.5 nm to 1.2 nm.

6. The multivalent metal-ion battery of claim 1, wherein said inter-planar spacing $d_{002}$ is from 1.2 nm to 2.0 nm.

7. The multivalent metal-ion battery of claim 1, further comprising an anode current collector supporting said multivalent metal or its alloy or further comprising a cathode current collector supporting said cathode active layer of graphite or carbon material.

8. The multivalent metal-ion battery of claim 7, wherein said anode current collector contains an integrated nano-structure of electrically conductive nanometer-scaled filaments that are interconnected to form a porous network of electron-conducting paths comprising interconnected pores, wherein said filaments have a transverse dimension less than 500 nm.

9. The multivalent metal-ion battery of claim 8, wherein said filaments comprise an electrically conductive material selected from the group consisting of electro-spun nano fibers, vapor-grown carbon or graphite nano fibers, carbon or graphite whiskers, carbon nano-tubes, nano-scaled graphene platelets, metal nano wires, and combinations thereof.

10. The multivalent metal-ion battery of claim 2, wherein said expansion treatment includes an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of said graphite or carbon material.

11. The multivalent metal-ion battery of claim 10, further comprising a constrained thermal expansion treatment.

12. The multivalent metal-ion battery of claim 1, wherein said carbon or graphite material contains a non-carbon element selected from oxygen, fluorine, chlorine, bromine, iodine, nitrogen, hydrogen, or boron.

13. The multivalent metal-ion battery of claim 1, wherein said electrolyte is selected from an aqueous electrolyte, organic electrolyte, molten salt electrolyte, or ionic liquid electrolyte.

14. A multivalent metal-ion battery comprising:
    an anode,
    a cathode, and
    an electrolyte in ionic contact with said anode and said cathode,
    wherein said anode contains, as an anode active material, a multivalent metal or alloy, selected from Be, Ca, Ba, La, Ti, Ta, Zr, Cd, In, or a combination thereof, and
    wherein said cathode comprises a cathode active layer of a graphite or carbon material, wherein said electrolyte contains $NiSO_4$, $ZnSO_4$, $FeSO_4$, $MnSO_4$, $CoSO_4$, $VSO_4$, $TaSO_4$, $CrSO_4$, $CdSO_4$, $GaSO_4$, $Zr(SO_4)_2$, $Nb_2(SO_4)_3$, $La_2(SO_4)_3$, $BeCl_2$, $Be(BF_4)_2$, Grignard reagents, tri(3,5-dimethylphenyl borane, magnesium dibutyldiphenyl, Mg(BPh2Bu2)2, magnesium tributylphenyl Mg(BPhBu3)2), or a combination thereof.

15. The multivalent metal-ion battery of claim 1, wherein the electrolyte comprises at least a metal ion salt selected from a transition metal sulphate, transition metal phosphate, transition metal nitrate, transition metal acetate, transition metal carboxylate, transition metal chloride, transition metal bromide, transition metal nitride, transition metal perchlorate, transition metal hexafluorophosphate, transition metal borofluoride, transition metal hexafluoroarsenide, or a combination thereof.

16. The multivalent metal-ion battery of claim 1, wherein the electrolyte comprises at least a metal ion salt selected from a metal sulphate, phosphate, nitrate, acetate, carboxylate, nitride, chloride, bromide, or perchlorate of zinc, aluminum, titanium, magnesium, calcium, beryllium, manganese, cobalt, nickel, iron, vanadium, tantalum, gallium, chromium, cadmium, niobium, zirconium, lanthanum, or a combination thereof.

17. The multivalent metal-ion battery of claim 1, wherein the electrolyte comprises an organic solvent selected from ethylene carbonate (EC), dimethyl carbonate (DMC), methylethyl carbonate (MEC), diethyl carbonate (DEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), tetrahydrofuran (THF), toluene, xylene, methyl acetate (MA), or a combination thereof.

18. The multivalent metal-ion battery of claim 1, wherein the electrolyte also supports reversible intercalation and de-intercalation of ions at the cathode, wherein said ions include cations, anions, or both.

19. The multivalent metal-ion battery of claim 1, wherein said cathode active layer of carbon or graphite material operates as a cathode current collector to collect electrons during a discharge of said multivalent metal-ion battery and wherein said battery contains no separate or additional cathode current collector.

20. The multivalent metal-ion battery of claim 1, wherein said cathode active layer of carbon or graphite further comprises an electrically conductive binder material which bonds said carbon or graphite material together to form a cathode electrode layer.

21. The multivalent metal-ion battery of claim 20, wherein said electrically conductive binder material comprises coal tar pitch, petroleum pitch, meso-phase pitch, a conducting polymer, a polymeric carbon, or a derivative thereof.

22. The multivalent metal-ion battery of claim 1, wherein said battery has an average discharge voltage no less than 1.0 volt and a cathode specific capacity greater than 200 mAh/g based on a total cathode active layer weight.

23. The multivalent metal-ion battery of claim 1, wherein said battery has an average discharge voltage no less than 1.0 volt and a cathode specific capacity greater than 300 mAh/g based on a total cathode active layer weight.

24. The multivalent metal-ion battery of claim 1, wherein said battery has an average discharge voltage no less than 1.5 volts and a cathode specific capacity greater than 200 mAh/g based on a total cathode active layer weight.

25. The multivalent metal-ion battery of claim 1, wherein said battery has an average discharge voltage no less than 2.0 volts and a cathode specific capacity greater than 300 mAh/g based on a total cathode active layer weight.

* * * * *